United States Patent Office 2,773,978
Patented Dec. 11, 1956

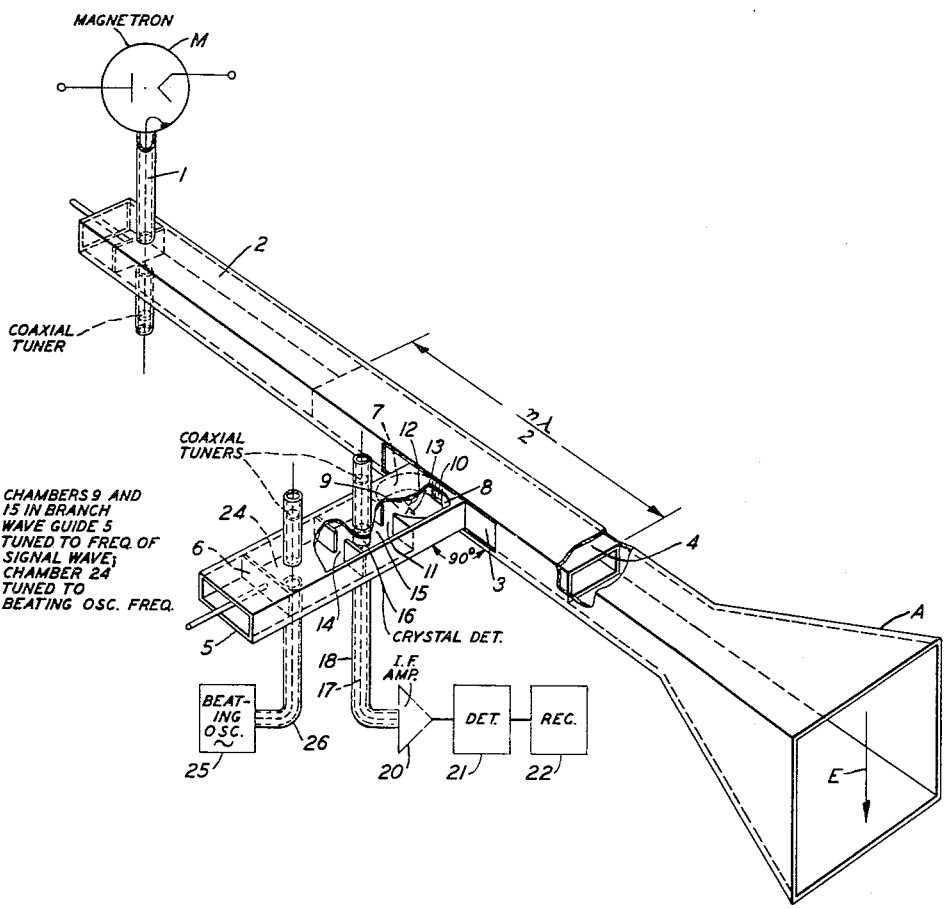

2,773,978

TRANSMITTING AND RECEIVING CIRCUITS FOR WAVE TRANSMISSION SYSTEMS

Harald T. Friis, Rumson, N. J., assignor to Bell Telephone Laboratories, Incorporated, New York, N. Y., a corporation of New York Application January 30, 1943, Serial No. 474,164

3 Claims. (Cl. 250—13)

The invention relates to transmitting and receiving circuits for wave transmission systems, and particularly to such circuits having a common portion, such as an antenna, for transmitting waves to and receiving waves from a wave transmission medium.

The circuits of the invention are particularly applicable for use in an object location or distance measuring system including means for transmitting recurring alternating pulses, usually of ultra-high frequency, to a wave transmission medium, and for receiving from that medium return pulses (echoes) of that frequency reflected from a distant object to be located, in combination with suitable apparatus for indicating on a time scale the time interval elapsing between the emission of each transmitted pulse and the arrival of the corresponding return pulse at the observation point, as a measure of the distance to the object; but are applicable as well to two-way radio or wire signal wave transmission systems of the duplex type.

Objects of the invention are to insure that the receiver in such a system is protected from the necessarily high voltages of the outgoing pulses or signal waves, that the attenuation of the transmission path between the local pulse generator or signal wave transmitter and the antenna or other common transmission device is low during transmitting periods, and that the incoming pulses or signal waves are transmitted to the receiver with minimum loss during receiving periods.

These objects are attained in accordance with the invention by a simple and compact circuit arrangement employing a branching connection of transmission lines for connecting the outgoing pulse generator or signal wave transmitter and the incoming pulse or signal wave receiver to the antenna or other common transmission device, and a switch comprising a resonant cavity and an associated spark gap, suitably coupled to the transmitter and receiver lines, operating to effectively disconnect the receiver from the common transmission device during each transmitting interval, and to reconnect it at the end of that interval and to maintain it so connected during the succeeding receiving interval.

In one embodiment of the invention, the local outgoing pulse generator or signal wave transmitter is connected to a common transmitting and receiving antenna by a line comprising a section of hollow pipe wave guide, and the receiver is connected to the antenna through a portion of that wave guide line and a second hollow pipe wave guide line including in its input a resonant chamber with an associated shunting spark gap, at right angles to the first wave guide line and connected thereto at a suitably located branching point. Electrical coupling between the two branched lines is obtained through an iris or window common to the side wall of the main wave guide and the input of the resonant chamber in the branch wave guide.

The discharge through the spark gap in the resonant chamber in response to the applied high voltage of the outgoing pulse or signal wave, will produce an effective short circuit at the common iris, thus maintaining the energy input to the receiver low during transmitting intervals. The distance of the common iris from the pulse generator or signal wave transmitter is suitably adjusted so that the effective shunting impedance of the pulse generator or signal wave transmitter in the non-transmitting condition near the branching point causes substantially all of the incoming pulse or signal wave energy to enter the receiver branch during receiving intervals.

The various objects and features of the invention will be better understood from the following complete description when read in conjunction with the accompanying drawing, the single figure of which shows partly in perspective and partly diagrammatically a system with parallel branching embodying one form of the invention.

In the drawing, the output of the transmitter M, which may be a pulse generator of the magnetron type generating recurring pulses of ultra-high frequency, such as is disclosed, for example, in the Patent No. 2,063,342, issued December 8, 1936 to A. L. Samuel, is coupled as shown by the coaxial link 1 with associated coaxial tuner, in proper impedance matching relation to one end of a section 2 of hollow pipe wave guide having a rectangular cross section, the other end of which is connected to the common transmitting and receiving antenna A, which may be of the horn type as illustrated. The axis of the coaxial link 1 connecting the output of the generator M to the wave guide 2 is perpendicular to the long side of the cross section of that guide so that the lines of electric force in the guide due to the wave propagated over the guide toward the antenna A are in a plane parallel to the short side of the cross section of the guide, as indicated by the vector E.

A longitudinal slot 3 is cut in one side wall (short side of cross section) of wave guide 2 at an intermediate point. The line 2 includes an intermediate link 4 of hollow pipe wave guide of rectangular cross section slightly smaller than that of the main wave guide 2, which is arranged within the wave guide 2 so that it is movable longitudinally within that guide along the slot 3. The length of this inner wave guide 4 is made equal to an integral number of half wave-lengths in the guide 4.

Another hollow pipe wave guide 5 of rectangular cross section, closed at its far end with a piston 6 as shown, branches out from the main wave guide 2, with its longitudinal axis perpendicular to the short side of the cross section of the latter guide and in the same plane as the longitudinal axis of the main wave guide 2. The curved metal strips 7 and 8 extending into the branch wave guide 5 at its other end form a cylindrical chamber or cavity 9 of high Q (ratio of reactance to resistance) within it, with the irises 10 and 11 at the two ends of the chamber, the dimensions of the cavity and the irises being made such that the chamber is resonant to the frequency of oscillations produced by the generator M. The metal strips 7 and 8 extend through the slot 3 in one side wall of the outer wave guide 2 and are affixed to the corresponding side wall of the inner pipe wave guide 4 in such manner that the iris 10 provides a small opening or window connecting the interior of the inner wave guide 4 with the interior of the resonant chamber 9, which electrically couples the main wave guide 2 to the branch wave guide 5 in the magnetic plane. The position of the iris 10 and thus the distance of the branching point between the wave guides 2 and 5, from the output of the generator M may be adjusted by moving the inner pipe wave guide 4 in one direction or the other along the slot 3 in the outer pipe wave guide 2. The portions of the slot 3 in the side wall of the main wave guide 2 which are not opposite the opening into the branch wave guide 5 from the inner wave guide 4 provided by iris 10, are, for all positions of the branching point, covered by solid portions of the side wall of inner wave guide 4. The spark gap electrodes 12 and 13 are connected as shown to the upper and lower walls of the resonant chamber 9 at its highest impedance points.

The iris 11 and a third iris 14 form the boundaries of a second chamber 15 in the branch wave guide 5. The crystal detector 16 forming the first detector stage of a superheterodyne signal receiver, is disposed within the resonant chamber 15 and is interposed in the inner conductor 17 of a coaxial conductor system comprising the flexible coaxial line 18 and associated coaxial tuner extending into chamber 15, serving to connect the output of the detector 16 with the input of the intermediate frequency amplifier 20. The output of the intermediate frequency amplifier 20 is connected to the input of the second detector stage 21 of the superheterodyne receiver, the output of which is connected to a suitable recorder or signal receiver 22, such as an oscilloscope.

The iris 14 and the end piston 6 of the branch wave guide 5 form the boundaries of a third chamber 24 within that guide tuned to the frequency of the beating oscillations generated by the beating oscillator 25, introduced into that chamber through the flexible coaxial line 26 having an associated coaxial tuner. The system of the drawing operates as follows:

During transmitting periods, the energy of the high frequency pulses impressed from the output of the generator M on the main wave guide 2 flows out over that wave guide toward the antenna A. Part of this wave energy will be radiated by that antenna to the associated wave transmission medium. A portion of the wave energy passing over the wave guide 2 will be diverted through the iris coupling 10 at the branching point into the input of the branch wave guide 5, and will build up across the gap between the spark gap electrodes 12 and 13 a sufficiently high voltage to cause an arc discharge in the gap between those electrodes. The effect of this is to produce a low impedance across the maximum impedance points of the resonant chamber 9 and thus a low apparent impedance across the input to that chamber. The effective short circuit thus produced at the coupling iris 10 will limit the amount of the transmitted pulse energy in the output of the resonant chamber 9, to a negligible value.

At the end of each transmitted pulse, the internal impedance of the magnetron generator M will change rapidly to produce an impedance mismatch with the characteristic impedance of the wave guide 2 to which it is coupled. To each reflected signal pulse picked up from the signal transmission medium by the antenna A and transmitted over the wave guide 2 toward the generator M, the impedance of that generator will appear as an equivalent shorting plunger the position of which with respect to the branching point (coupling iris 10) will depend on the distance of that point from the output of the generator M. As the length of the discontinuity (inner wave guide 4 carrying the coupling iris 10) in the path of the received pulses is an integral number of half wave-lengths long, the position of the wave guide 4 within the main wave guide 2 may be adjusted without disturbing the matching of the impedances of the generator and antenna. The distance of the coupling iris from the generator output is preferably made such that the impedance of the latter (when not firing) puts an effective short circuit at the right distance to the left of that iris to make substantially all of the energy of each incoming pulse pass into the branch wave guide 5.

The relatively low resonant voltage applied by each received signal pulse to the input of the resonant chamber 9 through the coupling iris 10 will be insufficient to cause the spark gap between the spark gap electrodes 12 and 13 to break down so that each pulse will be applied to the input of the detector 16 in the resonant chamber 15 with minimum loss. The applied signal pulse will combine in that detector with the beating oscillations transmitted thereto from the beating oscillator 25 through coaxial line 26 and resonant chamber 24, to produce in the detector output oscillations of the desired intermediate frequency which will be amplified by the tuned intermediate frequency amplifier 20, detected by the following detector stage 21 and will be applied with maximum amplitude to the input of the recorder 22.

When the arrangement of the invention is applied to a two-way signal transmission system of the duplex type, a terminal of the general type illustrated in the drawing would be employed at each end of a two-way signal transmission medium, such as the air medium in a radio system, in which case, the generator M at each terminal would comprise a source of alternating waves of a given high frequency modulated in any desired manner by lower frequency signals to be transmitted over this system; the resonant chamber 9 in the branch wave guide 5 at each terminal would be tuned to select the transmitted and received high frequency waves and the second detector 21 of the superheterodyne receiver at each terminal would operate to detect from the waves impressed on its input, the modulating lower frequency signals which would be reproduced by the associated signal receiver 22.

In the system of the invention as illustrated and described the wave guide line 2 and the branch wave guide line 5 are connected by a parallel branching connection. It is within the scope of the invention also to connect these lines in a series branching connection in which case the longitudinal axis of the branch wave guide would be at right angles to the long side of the cross section of the main wave guide line 2 and in the same plane as the longitudinal axis of the latter wave guide line.

Various other modifications of the arrangement of the invention illustrated and described, which are within the spirit and scope of the invention, will occur to persons skilled in the art.

What is claimed is:

1. In combination in a duplex signaling system, a signal wave pulse generator, a signal receiver, a common antenna for radiating the signal pulses produced by said generator and for picking up incoming wave pulses, a main hollow pipe wave guide connecting said generator to said antenna, a branch hollow pipe wave guide feeding said signal receiver, a chamber in said branch guide resonant to the frequency of the outgoing wave pulses produced by said generator and to the frequency of the incoming wave pulses picked up by said antenna, the input of said resonant chamber being electrically coupled directly to said first wave guide through an iris in the side wall of the latter, a spark gap connected across said resonant chamber, adapted to arc to effectively short circuit said chamber, and thus to effectively reduce the voltage input to said receiver, in response to the resonant voltage applied to said chamber by each signal pulse transmitted from said generator to said antenna, and to remain in the non-arcing condition in response to the relatively lower resonant voltage applied to said chamber by the incoming signal pulses received over said first line from said antenna, so as to provide a minimum of attenuation to said incoming pulses in transmission over said branch wave guide to the receiver.

2. The duplex system of claim 1 in which means are provided for adjusting the length of the wave guide between said iris and said pulse generator so that the effective shunting impedance of the latter in the non-pulsing condition causes substantially all of the energy of incoming signal pulses to be diverted at the branching point into said branch wave guide to said receiver.

3. The duplex system of claim 1, in which said main wave guide includes an intermediate portion containing the coupling iris, the length of which is equal to $$\frac{n}{2}$$

wave-lengths where $n$ is an integer, said intermediate wave guide portion being movable longitudinally with respect to the other portions, to adjust the distance of said iris from the output of said generator to the optimum value which will insure maximum input of incoming wave energy to said branch wave guide during signal receiving intervals.

References Cited in the file of this patent

UNITED STATES PATENTS

| | | |
|---|---|---|
| 2,106,770 | Southworth et al. | Feb. 1, 1938 |
| 2,235,010 | Chaffee | Mar. 18, 1941 |